(12) United States Patent
Ahn

(10) Patent No.: US 9,477,334 B2
(45) Date of Patent: Oct. 25, 2016

(54) CURVED TOUCH PANEL AND METHOD FOR FABRICATING THE SAME

(71) Applicant: BUWON PRECISION SCIENCES, Co., Ltd., Taoyuan County (TW)

(72) Inventor: Kyung-Chul Ahn, Taoyuan County (TW)

(73) Assignee: BUWON PRECISION SCIENCES CO., LTD., Guanyin Township, Taoyuan County (TW)

( * ) Notice: Subject to any disclaimer, the term of this patent is extended or adjusted under 35 U.S.C. 154(b) by 68 days.

(21) Appl. No.: 14/530,298

(22) Filed: Oct. 31, 2014

(65) Prior Publication Data

US 2016/0124534 A1    May 5, 2016

(51) Int. Cl.

| G06F 3/041 | (2006.01) |
|---|---|
| B29C 35/08 | (2006.01) |
| B32B 7/12 | (2006.01) |
| B32B 3/28 | (2006.01) |
| B32B 17/10 | (2006.01) |
| B29L 31/34 | (2006.01) |

(52) U.S. Cl.
CPC ........... *G06F 3/041* (2013.01); *B29C 35/0805* (2013.01); *B32B 3/28* (2013.01); *B32B 7/12* (2013.01); *B32B 17/10137* (2013.01); *B32B 17/10146* (2013.01); *B29C 2035/0827* (2013.01); *B29L 2031/3475* (2013.01); *B32B 2457/208* (2013.01); *G06F 2203/04103* (2013.01)

(58) Field of Classification Search
CPC .. G06F 3/04865; G06F 3/0487; G06F 3/044; G06F 3/04875; G06F 3/045

USPC ..................... 345/173–179; 178/18.01–18.04
See application file for complete search history.

(56) References Cited

U.S. PATENT DOCUMENTS

| 2009/0174683 | A1* | 7/2009 | Juni | G02B 6/12004 345/173 |
|---|---|---|---|---|
| 2011/0165393 | A1* | 7/2011 | Bayne | C03C 15/02 428/215 |
| 2011/0273383 | A1* | 11/2011 | Jeon | G06F 3/044 345/173 |
| 2012/0032916 | A1* | 2/2012 | Enoki | G06F 3/044 345/174 |
| 2013/0335375 | A1* | 12/2013 | Nishikawa | G06F 3/044 345/174 |
| 2015/0041050 | A1* | 2/2015 | Chen | B32B 38/1866 156/212 |

* cited by examiner

*Primary Examiner* — Kimnhung Nguyen
(74) *Attorney, Agent, or Firm* — Muncy, Geissler, Olds & Lowe, P.C.

(57) ABSTRACT

A curved touch panel and a method for fabricating the same are disclosed. The curved touch panel with a predetermined curvature, includes a curved substrate having a curved upper surface and a curved lower surface, the upper surface being chemically strengthened and the lower surface being acid-etched, an adhesive layer disposed on one of the curved upper surface and the curved upper surface of the curved substrate, and a curved touch sensor plate with flexibility having a curved upper surface and curved lower surface disposed on the adhesive layer opposite to the curved substrate, wherein the curved upper surface and the curved lower surface are acid-etched, and the curved substrate, the adhesive layer, and the curved touch sensor plate are attached together.

9 Claims, 10 Drawing Sheets

CURVED TOUCH PANEL AND METHOD FOR FABRICATING THE SAME

BACKGROUND OF THE INVENTION

1. Field of the Invention

The present invention generally relates to a curved touch panel and a method for fabricating the same, in particular to a curved touch panel formed by chemically strengthening, acid-etching, and attached by adhesive.

2. Description of the Related Art

Conventionally, heating glass at over 500° C. which is transition temperature or softening point for glass has been used to fabricate curved glass, and usually by helping of a mold of desired curvature in a furnace of batch or line type.

However, there were limitations such that different metal mold is needed for each different curvature or size of glass, to result in high costs and late delivery. In addition, after the heating step, the glass may be bended unexpectively due to change in thermal condition or depending on slow cooling condition and different unstable speed. And, when co-using the mold, flaw or crack of surface thereof could affect glass products, to lead faults such as pit or scratch. Furthermore, low productivity, high cost for facilities, and large consumption of energy to maintain high temperature are all weakness of the conventional way.

Heating and mold-using method to achieve curved products has been conventional in the field of metal and plastic industry. But, especially about glass, high temperature over 500° C. is needed for glass products and heat-treated glass could return to originally flat shape if long lasting slow-cooling is not involved. In addition, distortion could happen if heat is not uniformly applied throughout the glass.

Moreover, due to the heating treatment of high temperature, there have been problems such as striking (color change due to heat treatment), surface or internal defects of glass by condensation of volatile component, functional degradation of glass sensors, and color change of printed resin. It's also hard to control external diameter of curvature under high temperature condition. Therefore, a way is needed to achieve curvature of glass, which is able to perform under low temperature to resolve the above problems of the conventional way.

SUMMARY OF THE INVENTION

Therefore, it is a primary objective of the present invention to provide a curved touch panel and a method for fabricating the same to create a way to achieve curvature of glass, without using heat of high temperature, by removing stress using chemical etching on surface of either side of chemically strengthened glass.

To achieve the foregoing objective, the present invention provides a curved touch panel with a predetermined curvature, which includes a curved substrate having a curved upper surface and a curved lower surface, the upper surface being chemically strengthened and the lower surface being acid-etched, an adhesive layer disposed on one of the curved upper surface and the curved lower surface of the curved substrate, and a curved touch sensor plate with flexibility having a curved upper surface and curved lower surface disposed on the adhesive layer opposite to the curved substrate, wherein the curved upper surface and the curved lower surface are acid-etched, and the curved substrate, the adhesive layer, and the curved touch sensor plate are attached together.

In a preferred embodiment of the present invention, a thickness of the curved substrate may be about 100 μm to about 550 μm.

In a preferred embodiment of the present invention, a thickness of the curved touch sensor may be about 30 μm to about 100 μm.

In a preferred embodiment of the present invention, the predetermined curvature of the curved touch panel is due to an attachment together with the curved substrate, the adhesive layer, and the curved touch sensor plate.

In a preferred embodiment of the present invention, the attachment may be formed after processed by preliminarily hardening using ultra-violet curing and heating to exclude airgap.

In a preferred embodiment of the present invention, the attachment may be formed by molding and hardening.

In a preferred embodiment of the present invention, the molding and hardening may use a mold with heat under about 250° C.

In a preferred embodiment of the present invention, the molding and hardening may use a mold with ultra-violet curing.

To achieve the foregoing objective, the present invention further provides method for fabricating a curved touch panel, the method includes providing a substrate having an upper surface and a lower surface, chemically strengthening the upper surface and the lower surface of the substrate with a predetermined depth, disposing a first acid-resistant layer on the upper surface of the substrate using acid-resistant material, slimming the substrate by acid-etching the lower surface thereof, such that stress of the upper surface of the substrate causes a curvature of the slimmed substrate, providing a touch sensor plate having an upper surface and a lower surface, disposing a second acid-resistant layer on one of the upper surface and the lower surface of the touch sensor plate using acid-resistant material, slimming the touch sensor plate to a thickness by acid-etching the one of the upper surface and the lower surface without the second acid-resistant layer, such that the slimmed touch sensor plate becomes flexible, disposing an adhesive layer between the slimmed substrate and the slimmed touch sensor plate, preliminarily hardening the adhesive layer such that the slimmed substrate and the slimmed touch sensor plate are attached to each other by the adhesive layer therebetween to form a preliminary touch panel without airgap, and molding the preliminary touch panel into a predetermined curvature while hardening the preliminary touch panel to form a curved touch panel.

In a preferred embodiment of the present invention, a thickness of the slimmed substrate may be about 100 μm to about 550 μm.

In a preferred embodiment of the present invention, a thickness of the slimmed touch sensor may be about 30 μm to about 100 μm.

In a preferred embodiment of the present invention, the molding and hardening further use a mold with heat under about 250° C.

In a preferred embodiment of the present invention, the attachment may be formed after processed by preliminarily curing the adhesive layer to exclude airgap.

In a preferred embodiment of the present invention, the molding and hardening further uses a mold with ultra-violet curing under about 30 minute.

The curved touch panel and the method for fabricating the same according to the present invention can be utilized in any electrical devices, so that the present invention has the following advantages:

(1) The curved touch panel and the method for fabricating a curved touch panel of the present invention can create a way to achieve curvature of glass, without using heat of high temperature, by removing stress of either side of chemically strengthened glass. When stress of either side of chemically strengthened glass is removed, the glass automatically curves due to imbalance of stress between two sides. Then, desired curvature of glass can be achieved by controlling the above phenomenon. During this procedure, normally strong acid such as hydrofluoric acid, nitric acid, ammonium acid is used to reduce thickness of glass, which is performed under low temperature to resolve the above problems of the conventional way.

(2) The curved touch panel of present invention doesn't need varieties of molds or furnaces with high temperature, curved glass may produce by chemically slimming one side of chemically-strengthened glass and may achieve desired curvature by controlling depth of chemical strengthening and etching amount, and selecting an appropriate glass with desired thickness such that bending and twisting of glass may be avoided because there is no significant change of thermal condition. Also, the whole production cost thus to be competitive.

BRIEF DESCRIPTION OF THE DRAWINGS

The detailed structure, operating principle and effects of the present invention will now be described in more details hereinafter with reference to the accompanying drawings that show various embodiments of the invention as follows.

FIGS. 4A to 4G, FIGS. 4H-1 to 4H-6, and FIGS. 4I to 4J are cross-sectional views schematically illustrating each step of the method for fabricating a curved touch panel according to the present invention.

DETAILED DESCRIPTION OF THE PREFERRED EMBODIMENTS

Figure 1:
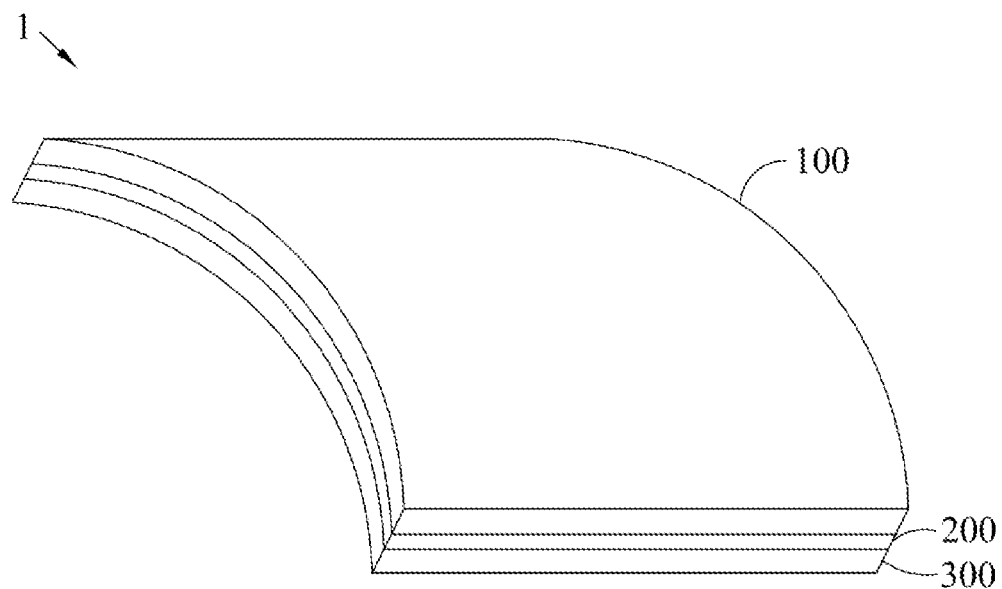
FIG. 1 is a perspective view of a curved touch panel in accordance with the present invention.

As used herein, the term "and/or" includes any and all combinations of one or more of the associated listed items. Expressions such as "at least one of," when preceding a list of elements, modify the entire list of elements and do not modify the individual elements of the list.

The invention will now be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be further understood that although the terms first and second are used herein to describe various elements, these elements should not be limited by these terms. These terms are only used to distinguish one element from another element.

For clarity and conciseness of the description, parts may be omitted from the drawings, and same reference characters or numerals may indicate identical parts or analogous parts. In the drawings, thicknesses of layers, films, panels, regions, etc., may be exaggerated for clarity and may not limit embodiments of the invention. If an element such as a layer, film, region, or substrate is referred to as being "on" another element, it can be directly on the other element, or an intervening element may be present.

Although the terms first, second, etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer, or section. Thus, a first signal, element, component, region, layer, or section discussed below may be termed a second signal, element, component, region, layer, or section without departing from the teachings of the present invention.

Figure 2:
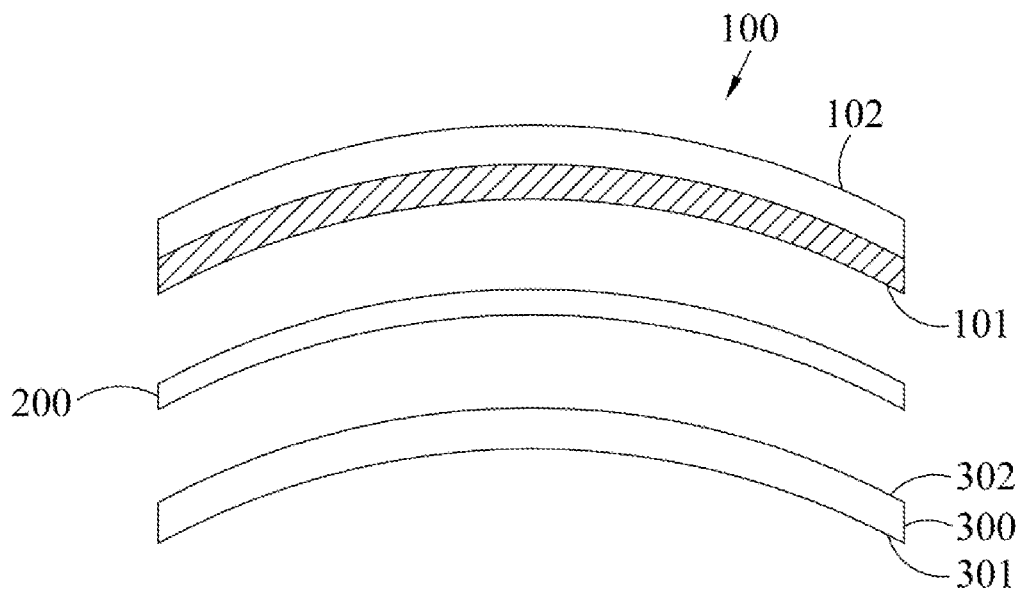
FIG. 2 is an exploded cross-section view of the curved touch panel in accordance with the present invention.

FIG. 1 is a perspective view of a curved touch panel in accordance with the present invention, FIG. 2 is an exploded cross-section view of the curved touch panel in accordance with the present invention.

With reference to FIG. 1 for a perspective view and FIG. 2 for an exploded cross-section view of a curved touch panel 1 in accordance with the present invention, the curved touch panel 1 is applicable for an electronic device, and the curved touch panel 1 comprising a curved substrate 100, an adhesive layer 200, and a curved touch sensor plate 300. The curved substrate 100 having a curved upper surface 101 and a curved lower surface 102, the upper surface 101 being chemically strengthened with a predetermined depth, in a preferred embodiment of the present invention, the predetermined depth may be, but not limit to, about 9 μm to 40 μm, and a thickness of the curved substrate 100 may be, but not limit to, about 100 μm to 550 μm to achieve desired curvature of the present exemplary embodiment. Here, only one surface of the curved substrate 100 is chemically strengthened, the stress generated on the upper surface 101 of the curved substrate 100 and cohesive force/condensing force between the upper surface 101 and the lower surface 102 in the curved substrate 100 may be different. Note that upon the lower surface 102 being acid-etched, the curved substrate 100 may be curved in the direction of the upper surface 101. That is, the lower surface 102 may become the external circumference of the curved touch panel 1, and the curvature of the curved substrate 100 depends on the predetermined depth during the chemically strengthening.

Moreover, the curved substrate 100 may serve as a cover plate, such as cover lens for the touch panel 1, but not limit to, the curved substrate 100 may include electric component of the touch panel, and the curved substrate 100 may be a transparent cover glass or a printed cover lens. The chemical strengthening for the curved substrate 100 is a process in which glass is fortified using an ion-exchange method, but not limited to. The process is used for thin glass to increased strength. As a result of the process offers an increased surface compression that strengthening the glass without creating distortions, and the glass surface is rendered harder and more resistant to scratching. With chemical-tempered glass there is no risk of spontaneous breakage. In addition to the ion-exchange method, any method for creating a stress difference in the curved substrate 100 may be used in accordance with the concept of the present invention. The acid-etching of the lower surface 102 may use, but not limit to, strong acid such as hydrofluoric acid, nitric acid, solution with ammonium acid to slim the curved substrate 100 down to a desired thickness, and the detail process of the slimming and acid-etching will be further described in detail hereinafter.

The adhesive layer 200 may be disposed on one of the curved upper surface 101 and the curved lower surface 102 of the curved substrate 100 according to needs of designer, here, The adhesive layer 200 may be disposed on one of the curved upper surface 101, and a curved touch sensor plate 300 with flexibility having a curved upper surface 301 and curved lower surface 302 disposed on the adhesive layer 200 opposite to the curved substrate. The curved upper surface 301 and the curved lower surface 302 are acid-etched, and the curved substrate 100, the adhesive layer 200, and the curved touch sensor plate 300 are attached together through the adhesive layer therebetween.

Here, the adhesive layer 200 may utilize optical clear resin (OCR) or optical clear adhesive (OCA), which achieve high transparency, low strain and low stress, are also effective for reinforcing device structures, and the OCR or OCA uses herein may have photo-curable (e.g. ultra-violet curing) or heat-curable properties, and the curing process includes preliminarily hardening, i.e. preliminarily curing to exclude airgap. That is, applying the OCR or OCA to one or both of the curved substrate 100 and touch sensor plate 300, and preliminarily hardening the OCA or OCR by ultra-violet light to gel state to adjust thickness of the layer. The two parts then being attached together and followed by a molding process. The attachment of the curved substrate 100 and the curved touch sensor plate 300 being placed on the mold made of transparent material such as quartz, glass, PC, or Acryl, but not limit to, and then final curing process being processed to form the adhesive layer 200. The final hardening may use the mold with heat under about 250° C. corresponds to the heat-curable properties of the OCR and OCA, or may use the mold with ultra-violet curing corresponds to the photo-curable properties of the OCR or OCA.

The curved touch sensor plate 300 is also acid-etched by strong acid to slimmed a thickness thereof, and the curved touch sensor 300 may be flexible after slimmed and without being chemically strengthened, unlike the curved substrate 100. The curved touch sensor plate 300 may be a touch sensor glass made of Soda Lime glass, but not limit to. The preferably exemplary embodiment of the present invention for the curved touch sensor plate 300 is that the touch sensor glass with initial thickness of about 0.4 mm to about 1.1 mm and is slimmed down to about 30 µm to about 100 µm in making the flexible touch sensor glass. the curved touch sensor plate 300 which is processed to have straightening tendency, i.e. opposite stress to balance the stress generated by the curved substrate 100 to maintain appropriate curvature of the curved touch panel. The curved touch sensor plate 300 used herein may include sensing patterns with different direction, transparent electrodes made of conductive material, buffer layers, insulating layers, etc. commonly used in touch panel of an electrostatic capacity type or electrostatic resistant type, therefore the detailed description will be omitted.

From above, the curved touch panel of the present invention can be utilized in any electronic devices, such that the electronic device includes the curved touch panel. Specifically, the concept of the present invention can be applied not only to two pieces of glasses, but also to glass-plastic combination. For example, thinned flexible touch sensor glass may be attached to an accomplished curved plastic cover lens based on concept of this invention. The present invention adopts a low-temperature process, under which plastic can be handles properly, and the problems and limitation due to high-temperature process such as high production cost, pit or scratch of glass surface due to flaw or crack of the mold, and heat deterioration of glass surface, etc., may be avoided.

Figure 3A:
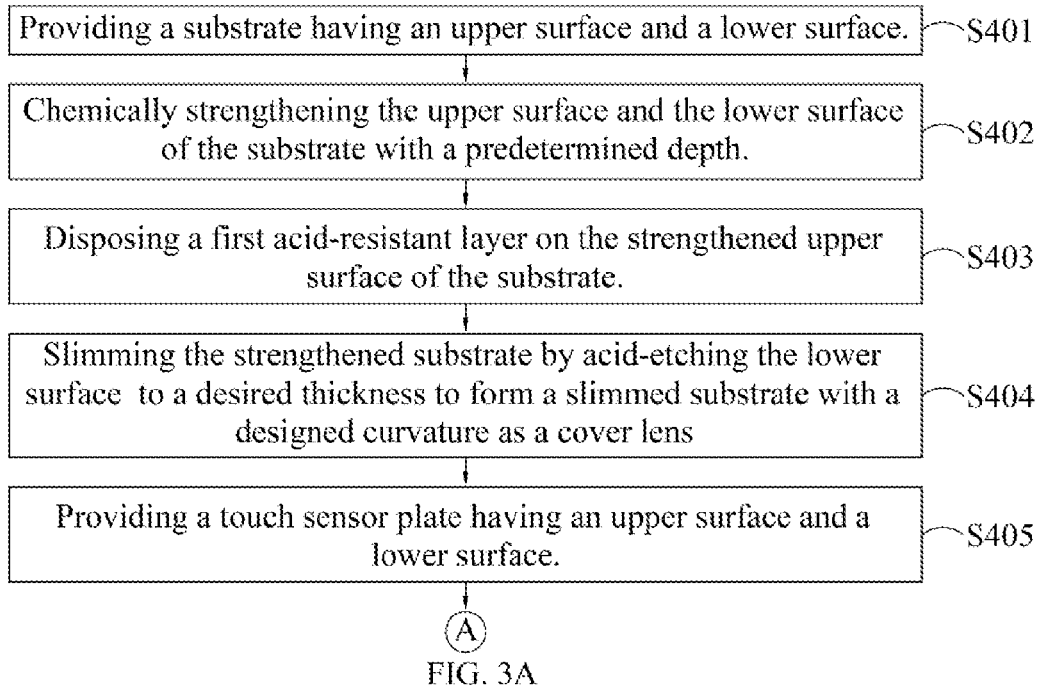
FIG. 3A and FIG. 3B are a flow charts subsequently illustrating a method for fabricating a curved touch panel in accordance with the present invention.
Figure 3B:
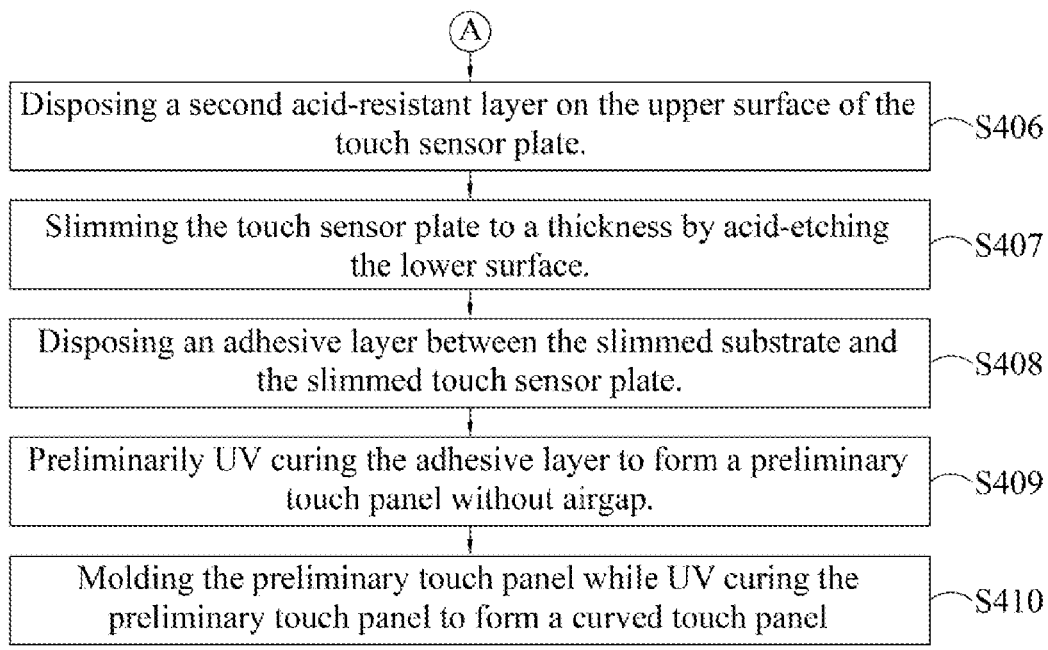

FIG. 3A and FIG. 3B are a flow charts subsequently illustrating a method for fabricating a curved touch panel in accordance with the present invention, and FIG. 4A to FIG. 4F are cross-sectional views schematically illustrating each step of the method for fabricating a curved touch panel according to the present invention.

Referring to FIG. 3 and FIG. 4A to FIG. 4J, subsequently shows steps of a method for fabricating a curved touch panel. Firstly, providing a substrate 400 having an upper surface 401 and a lower surface 402 (Step S401) with a thickness T1, the substrate 400 may serve as a cover plate for the touch panel 1, but not limit to, the substrate 400 may include electric component of the touch panel, and the substrate 400 may be a transparent cover glass or a printed cover glass. The thickness T1 may be a thickness of glass substrate commonly used for cover glass. Next, chemically strengthening the upper surface 401 and the lower surface 402 of the substrate 400 with a predetermined chemical strengthening depth T2 (Step S402), the predetermined depth T2 may be, but not limit to, about 9 µm to 40 µm, and the strengthening of the substrate 400 is as same as the strengthening of the curved substrate 100 mentioned above, therefore the detail description thereof will be omitted.

After the strengthening the substrate 400, the strengthened upper surface 401' and strengthened lower surface 402' of the strengthened substrate 400' generate. Next, disposing a first acid-resistant layer 410 on the strengthened upper surface 401' of the strengthened substrate 400' using acid-resistant material (Step S403) to prepare for slimming the substrate 400. The acid-resistant material may be printed or sprayed on either side of the strengthened substrate 400' to form an acid-resistant layer, here, the acid-resistant material corresponds to the strong acid uses for slimming the strengthened substrate 400' to protect the strengthened upper surface 401'.

Then, slimming the strengthened substrate 400' by acid-etching the lower surface 402' to a desired thickness T1' to form a slimmed substrate 400" with a designed curvature as a cover lens (Step S404), such that stress difference between the strengthened upper surface 401' and etched lower surface 402" of the slimmed substrate 400" causes the designed curvature. The thickness T1' of the slimmed substrate 400" may be, but not limit to, about 100 µm to 550 µm.

Next, providing a touch sensor plate 600 having an upper surface 601 and a lower surface 602 (Step S405), the touch sensor plate 600 with a thickness T3 is similar to the touch sensor plate 300 mentioned above, thickness T3 is of about 0.4 mm to about 1.1 mm. Disposing a second acid-resistant layer 420 on one of the upper surface and the lower surface of the touch sensor plate using acid-resistant material (Step S406) to prepare for slimming of the touch sensor plate 300.

After that, slimming the touch sensor plate 600 to a thickness T3' by acid-etching at least one of the upper surface and the lower surface without the second acid-resistant layer 420 (Step S407), such that the slimmed touch sensor plate 600' becomes flexible. The thickness T3' is within a range from about 30 µm to about 100 µm. After the above treatment, cleaning of the slimmed substrate 400" and the slimmed touch sensor plate 600' is performed carefully to not let the strong acid remain (not shown).

Figure 4A:
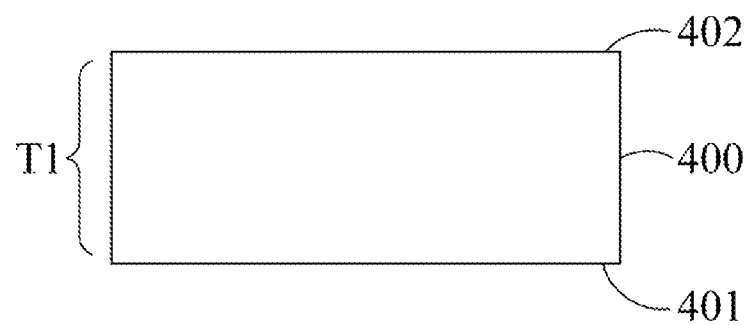
Figure 4B:
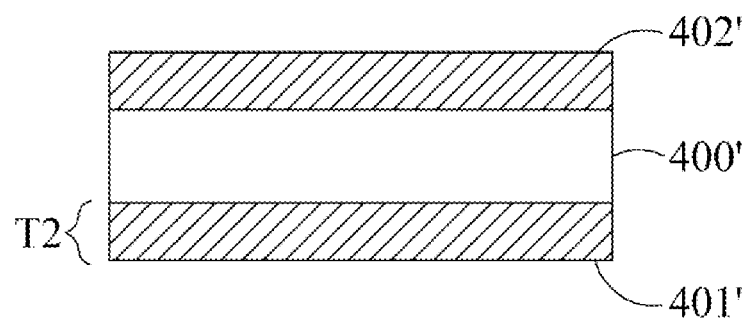
Figure 4C:
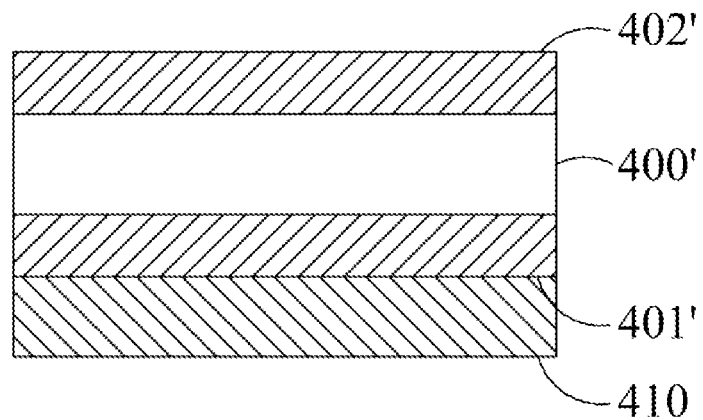
Figure 4D:
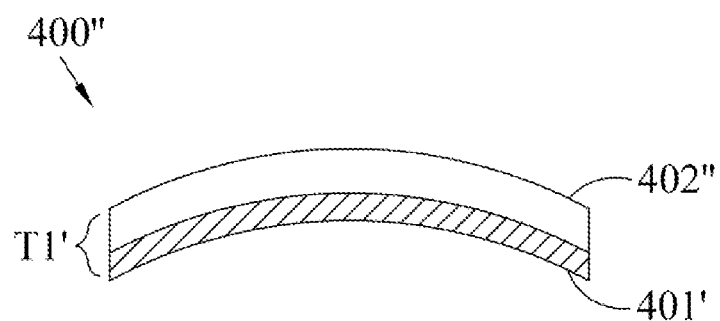
Figure 4E:
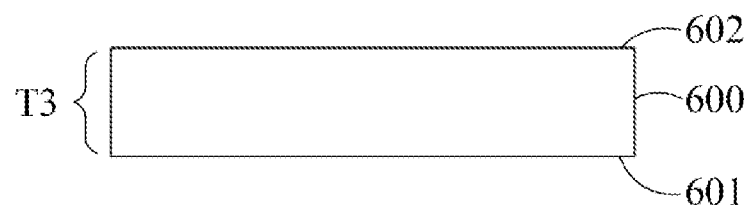
Figure 4F:
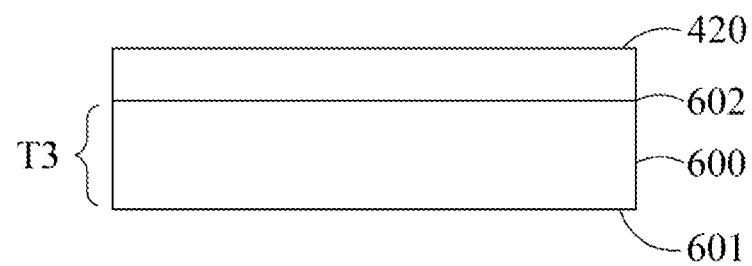
Figure 4G:
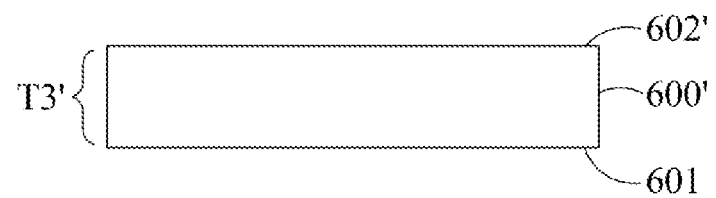
Figures 1, 4H:
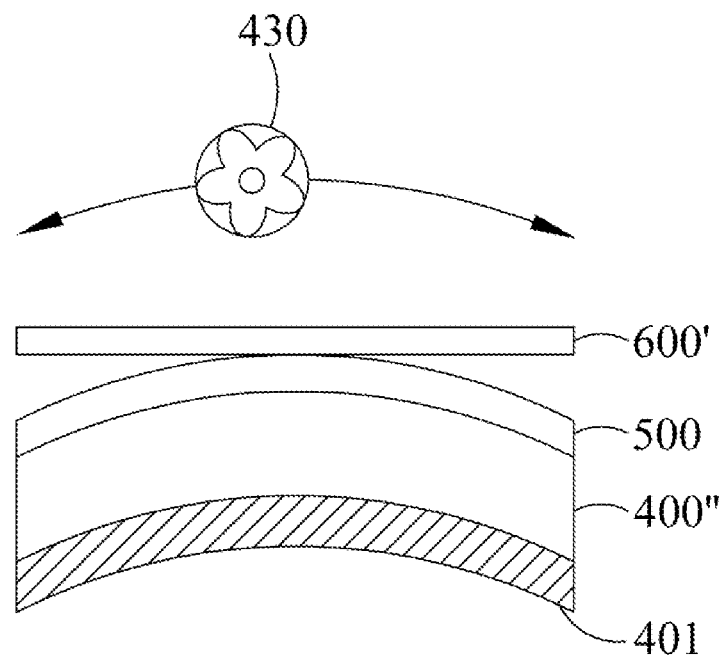
Figures 2, 4H:
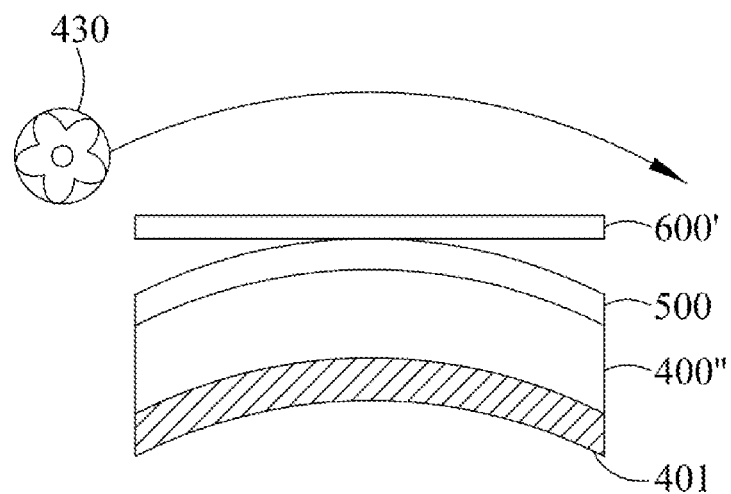
Figures 3, 4H:
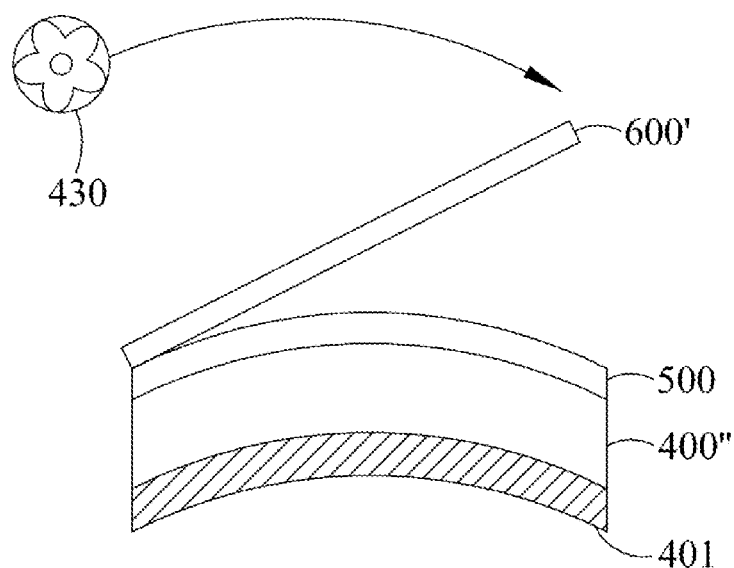

Subsequently, disposing an adhesive layer 500 between the slimmed substrate 400' and the slimmed touch sensor plate 600' (Step S408). Here, various exemplary embodiments of the disposing of the adhesive layer 500 between the slimmed substrate 400' and the slimmed touch sensor plate 600' are shown in FIG. 4H-1 to FIG. 4H-6. In FIG. 4H-1, the adhesive layer 500 may be applied on the slimmed substrate 400" first, then a center of the slimmed touch sensor plate is put on a center of the adhesive layer 500 preliminarily. A roller 430 may be used for attaching the slimmed touch sensor plate 600' to the slimmed substrate 400", and excluding airgap therebetween by the adhesive layer 500. The roller 430 starts from the center of the slimmed touch sensor plate 600', and comes in contact with the slimmed touch sensor plate 600' from a top surface thereof. Then the roller 430 starts to press the slimmed touch sensor plate 600' to the slimmed substrate 400" from the center to the periphery of the slimmed touch sensor plate 600' to form an attachment of the slimmed substrate 400", the adhesive layer 500, and the slimmed touch sensor plate 600'. FIG. 4H-2 shows the roller 430 starts from a side to roll to another side of the slimmed touch sensor plate 600'. FIG. 4H-3 shows a similar setup as FIG. 4H-2, except that the side of the slimmed touch sensor plate is put on a side of the adhesive layer 500 preliminarily. The adhesive layer 500 used here is as the same as the adhesive layer 200 mentioned above, therefore omit the detail description.

Figures 4, 4H:
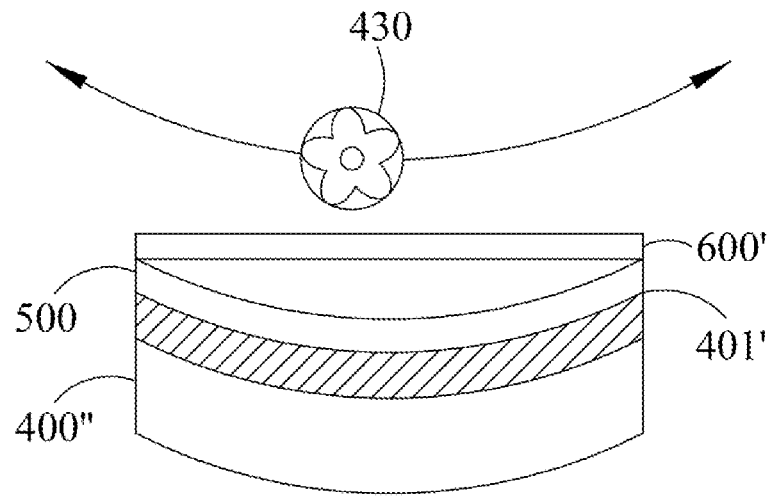
Figures 4, 4H, 5:
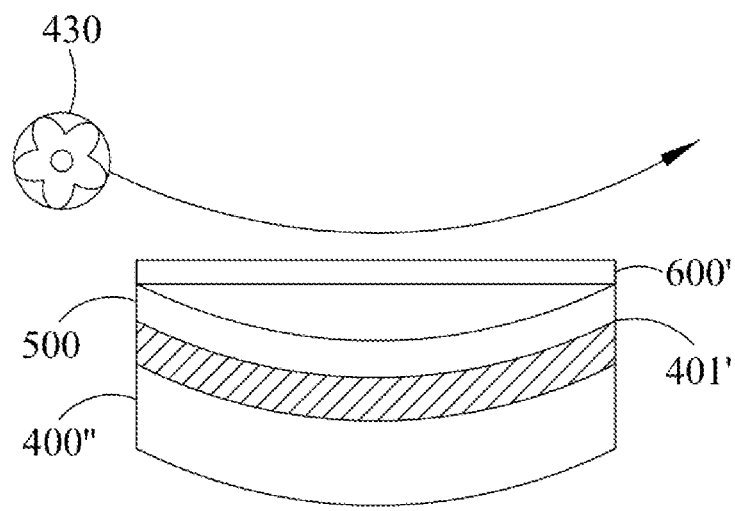
Figures 4, 4H, 5, 6:
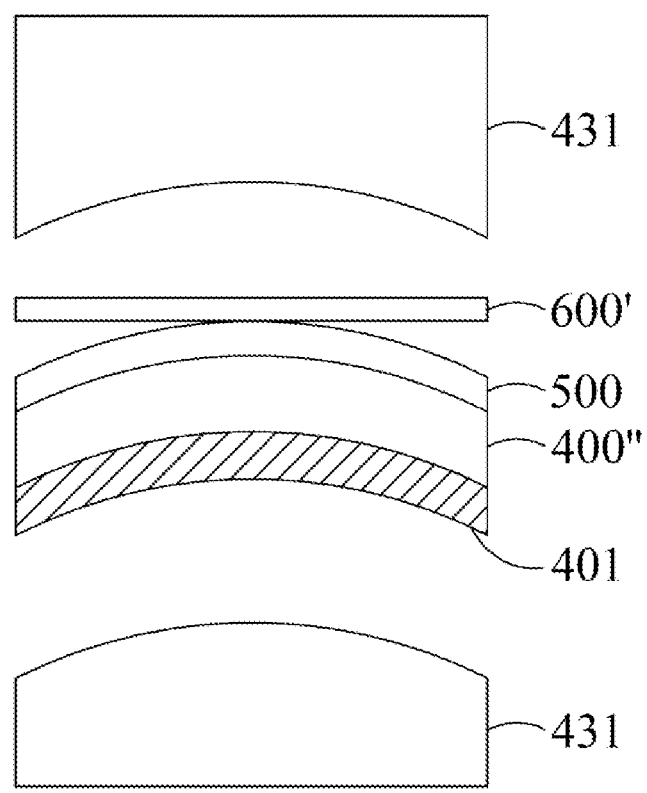

FIG. 4H-4 shows that the adhesive layer 500 is applied on the strengthened upper surface 401', and both sides of the slimmed touch sensor plate 600' are respectively put on both sides of the adhesive layer 500, preliminarily. The roller 430 then starts to press the slimmed touch sensor plate 600' to the slimmed substrate 400" from the center to the periphery of the slimmed touch sensor plate 600' to form an attachment of the slimmed substrate 400". A configuration of FIG. 4H-5 is similar to the configuration of FIG. 4H-4, except that the roller 430 starts from one side of the slimmed touch sensor plate 600'. FIG. 4H-6 shows the using of a mold 431 to press from both up and down sides of a to-be-attached structure to form the attachment of the slimmed substrate 400", the adhesive layer 500, and the slimmed touch sensor plate 600'.

Figure 4I:
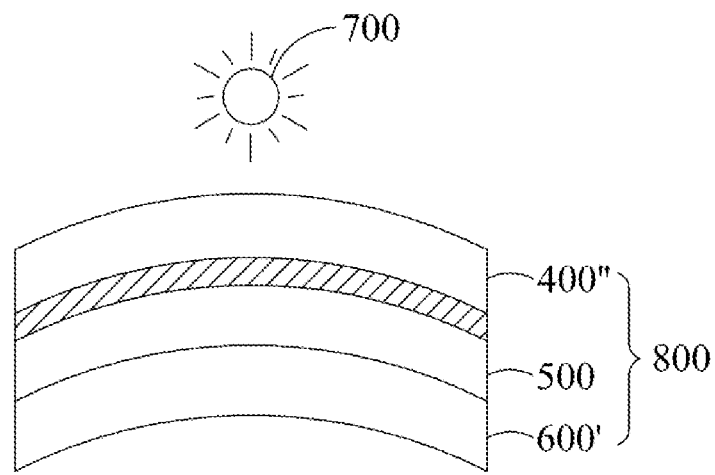

Afterward, preliminarily UV curing the adhesive layer 500 such that the slimmed substrate 400" and the slimmed touch sensor plate 600' are attached to each other by the adhesive layer 500 therebetween to form a preliminary touch panel 800 without airgap (Step S409), as shown in FIG. 4I. Here, a preliminary touch panel 800 formed after use a light source 700 to firstly harden the attachment of the slimmed substrate 400", the adhesive layer 500, and the slimmed touch sensor plate 600', and to ensure the airgap may also be excluded.

Figure 4J:
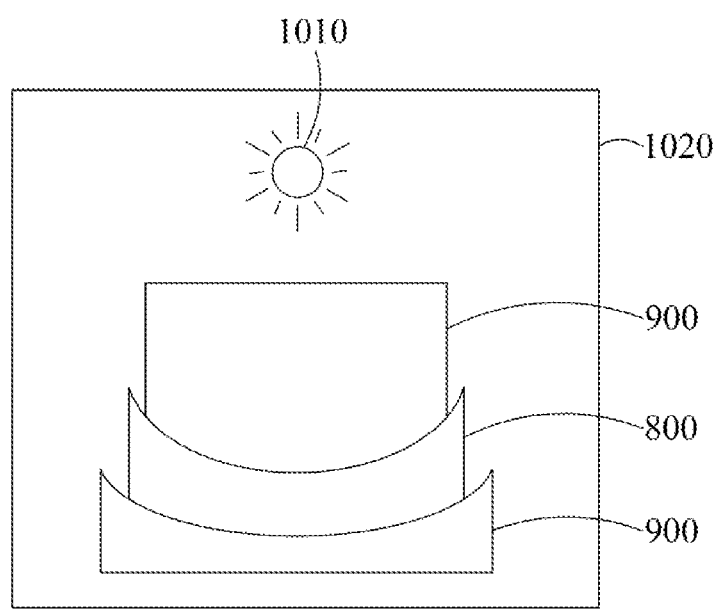

Molding of the preliminary touch panel 800 is then performed to obtain a predetermined curvature while UV curing the preliminary touch panel 800 to form a curved touch panel (Step S410), as shown in FIG. 4J. Here, the preliminary touch panel 800 is further treated in a chamber 1020, such as autoclave or ultra-violet curing chamber, for final hardening the adhesive layer made of OCR or OCA. The hardening of the preliminary touch panel 800 comprises using a mold 900 with ultra-violet curing by a light ultra-violet source 1010 under about 30 minutes. In addition to the ultra-violet hardening, the heat hardening may also be used for final hardening. In a preferred embodiment of the present, the light source 1010 may be a heat source, and the heat hardening may under a temperature of about 250° C. The mold 900 with a desired curvature is utilized in the molding. The preliminary touch panel 800 may be molded by helping of the weight of the mold 900 to accomplish the curved touch panel, and the curvature of the completed touch panel may be R400 to R40 or less. The mold may be make of transparent material such as quartz, glass, PC or Acryl, but not limit to.

In summation of the description above, the curved touch panel and the method for fabricating a curved touch panel of the present invention can create a way to achieve curvature of glass, without using high temperature, by removing stress of either side of chemically strengthened glass. When stress of either side of a chemically strengthened glass is removed, the glass automatically curves due to imbalance of stress between two sides of the chemically strengthened glass. Desired curvature of glass can be achieved by controlling the depth of the chemically strengthening and the etched thickness. Strong acid is used to reduce and slim the thickness of glass, which is performed under low temperature to resolve the above problems of the conventional way under high temperature.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A curved touch panel with a predetermined curvature, comprising:
   a curved substrate having a curved upper surface and a curved lower surface, the upper surface being chemically strengthened and the lower surface being acid-etched to be slimmed down to a thickness of about 100 µm to about 550 µm, wherein a curvature of the curved substrate is caused by a stress difference between the chemically strengthened upper surface and the acid-etched lower surface;
   an adhesive layer disposed on one of the curved upper surface and the curved lower surface of the curved substrate; and
   a curved touch sensor plate with flexibility having a curved upper surface and curved lower surface disposed on the adhesive layer opposite to the curved substrate, wherein at least one of the curved upper surface and the curved lower surface are acid-etched to be slimmed down to a thickness of about 30 µm to about 100 µm, and the curved substrate, the adhesive layer, and the curved touch sensor plate are attached together.

2. The curved touch panel of claim 1, wherein the predetermined curvature of the curved touch panel is due to an attachment together with the curved substrate, the adhesive layer, and the curved touch sensor plate.

3. The curved touch panel of claim 2, wherein the attachment is formed after processed by preliminarily hardening to exclude airgap.

4. The curved touch panel of claim 3, wherein the attachment is formed by molding and hardening.

5. The curved touch panel of claim 4, wherein the molding and hardening use a mold with heat under about 250° C.

6. The curved touch panel of claim 4, wherein the molding and hardening use a mold with ultra-violet curing.

7. A method for fabricating a curved touch panel, the method comprises following steps:
   providing a substrate having an upper surface and a lower surface;
   chemically strengthening the upper surface and the lower surface of the substrate with a predetermined depth;
   disposing a first acid-resistant layer on the upper surface of the substrate using acid-resistant material;
   slimming the substrate by acid-etching the lower surface thereof to a thickness of about 100 μm to about 550 μm, such that a stress difference between the chemically strengthened upper surface and the acid-etched lower surface of the substrate causes a curvature of the slimmed substrate;
   providing a touch sensor plate having an upper surface and a lower surface;
   disposing a second acid-resistant layer on one of the upper surface and the lower surface of the touch sensor plate using acid-resistant material;
   slimming the touch sensor plate to a thickness by acid-etching at least one of the upper surface and the lower surface without the second acid-resistant layer to a thickness of about 30 μm to about 100 μm, such that the slimmed touch sensor plate becomes flexible;
   disposing an adhesive layer between the slimmed substrate and the slimmed touch sensor plate;
   preliminarily hardening the adhesive layer such that the slimmed substrate and the slimmed touch sensor plate are attached to each other by the adhesive layer therebetween to form a preliminary touch panel without airgap; and
   molding the preliminary touch panel into a predetermined curvature while hardening the preliminary touch panel to form a curved touch panel.

8. The method of claim 7, wherein the molding and hardening further use a mold with heat under about 250° C.

9. The method of claim 8, wherein the molding and hardening further uses a mold with ultra-violet curing under about 30 minutes.

* * * * *